E. A. HALBLEIB.
ELECTRIC APPARATUS FOR MOTOR VEHICLES.
APPLICATION FILED JUNE 13, 1914.

1,150,676.

Patented Aug. 17, 1915.
2 SHEETS—SHEET 1.

Witnesses:
L. Thon
C. W. Carroll

Inventor:
Edward A. Halbleib
by his attorneys
Davis & Worsey

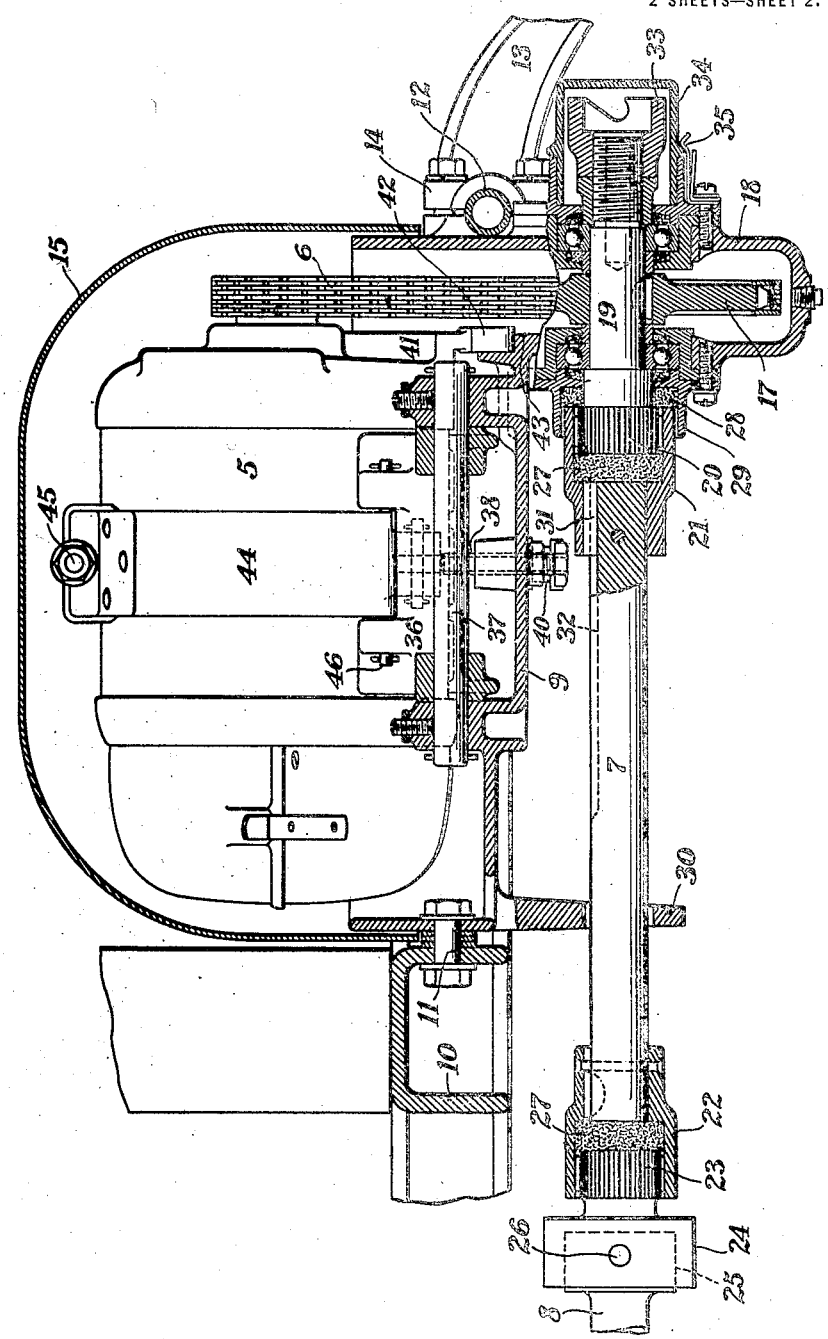

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

ELECTRIC APPARATUS FOR MOTOR-VEHICLES.

1,150,676.         Specification of Letters Patent.         Patented Aug. 17, 1915.

Application filed June 13, 1914.   Serial No. 844,994.

*To all whom it may concern:*

Be it known that I, EDWARD A. HALBLEIB, a citizen of the United States, and resident of Rochester, in the county of Monroe and State of New York, have invented certain new and useful Improvements in Electric Apparatus for Motor-Vehicles, of which the following is a specification.

This invention relates to electric apparatus, employed in connection with motor-vehicles, in which a dynamo-electric machine is connected with the engine of the vehicle in such a manner that it may be employed either as an electric generator, when driven by power derived from the engine, or as an electric motor to furnish power by which the engine may be started, or for both of these purposes.

The object of the invention is to produce electric apparatus, including a dynamo-electric machine, so constructed and arranged that it may be easily applied to a motor-vehicle in a convenient and accessible position at the end thereof, without interfering with any of the internal arrangements of the vehicle, and that the apparatus, when so mounted, shall be connected with the engine of the vehicle in a simple and efficient manner.

To the foregoing ends I employ an arrangement in which a dynamo-electric machine, mounted at the end of the vehicle at which the crank-shaft of the engine is accessible—the forward end as vehicles are commonly constructed—is arranged with its armature-shaft parallel with the axis of the engine-shaft, and in which the end of the armature-shaft most remote from the engine-shaft is connected, by means of suitable gearing, with a power-shaft extending rearwardly to the engine-shaft. An arrangement of universal joints, by which the power-shaft is connected with the gearing and with the engine-shaft, together with various other features of construction which contribute to the practical success of the apparatus, will be set forth hereinafter.

Figure 1:
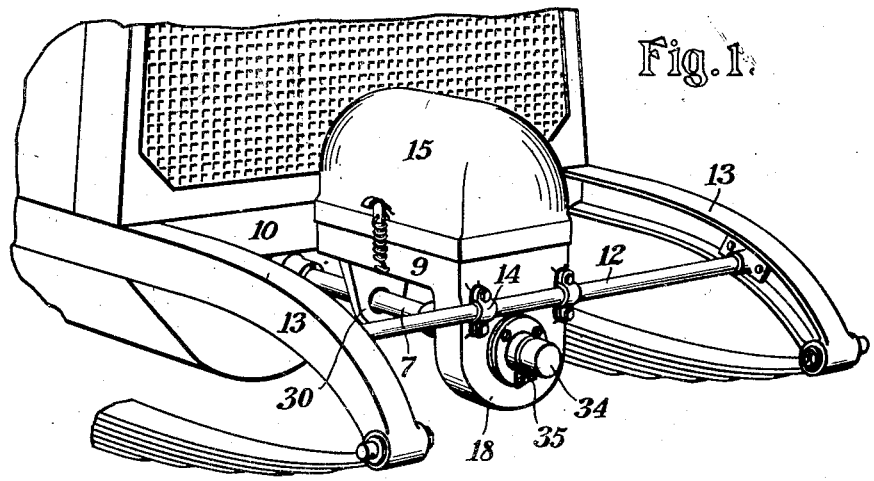
Figure 2:
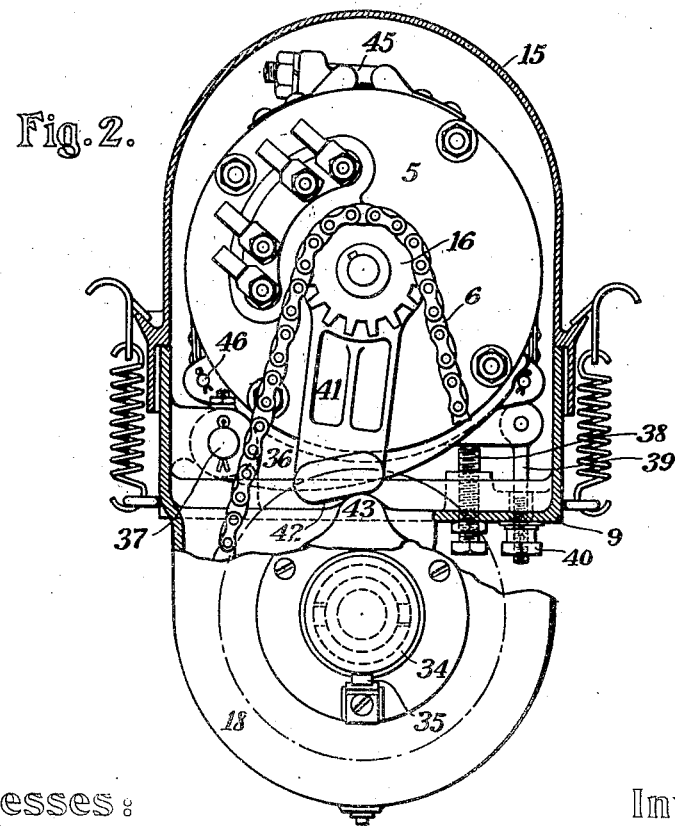

In the drawings, Figure 1 is a perspective view of apparatus embodying the present invention, together with the adjacent portions of a motor-vehicle upon which it is mounted; Fig. 2 is a front-elevation of the apparatus, on a larger scale than Fig. 1, with parts broken away to show the interior construction; and Fig. 3 is a longitudinal section of the apparatus, together with adjacent parts of the motor-vehicle.

The illustrated embodiment of the invention comprises a dynamo-electric machine 5 of the inclosed type. No other electrical features of the apparatus are illustrated and described herein, as it will be understood by those skilled in the art that this dynamo may be employed, in any ordinary or suitable manner, as either a generator or an electric motor, or both, in connection with a suitably arranged battery and other electrical apparatus.

The armature-shaft of the dynamo is connected by gearing, including sprocket-wheels and a chain 6, with a power-shaft 7 which extends rearwardly to the forward end of a shaft 8, which will be understood to illustrate the crank-shaft of the engine as it is usually located in a motor-vehicle. This engine-shaft terminates slightly below, and in the rear of, a transverse member 10 of the frame of the vehicle, which passes in the usual manner beneath the radiator, and this frame-member is fixed, at its ends, to the usual side frame-members 13 of the vehicle.

The dynamo is supported, indirectly, by a base 9 in the form of a flanged and recessed casting, and the rear end of this base is supported by bolts 11, which pass through the rear flange on the base and through a flange on the frame-member 10, as shown in Fig. 3. The forward end of the base is supported by a cross-bar 12, of which the ends are fixed to the side frame-members 13 of the vehicle, while its middle portion passes through clamps 14 on the base. The base makes a partial housing for the dynamo and the gearing, which is completed by a cover 15 removably secured in place by any ordinary or suitable means.

The gearing by which the dynamo is connected with the power-shaft 7 comprises a sprocket-wheel 16, fixed on the forward end of the armature-shaft and connected, by the chain 6, with a sprocket-wheel 17 which is housed within a downwardly-extending part 18 of the base 9. The sprocket wheel 17 is fixed on a short countershaft 19 journaled in ball-bearings in the housing 18, and this countershaft is connected, in turn, with the power-shaft 7 by means of a universal joint, while a similar universal joint connects the rear end of the power-shaft with the engine-shaft 8. The forward joint comprises an inner member 20 having the form of a gear-wheel or pinion, which is fixed to the shaft 19, while the outer joint-member is in the form of a shell 21 fixed to the shaft 7, this shell having internal gear-like teeth which mesh with the teeth of the part 20. These teeth fit with sufficient looseness to permit a substantial relative rocking movement of the shafts 7 and 19, and they do not restrict relative longitudinal movement of the shafts, but at the same time they secure the shafts together against relative rotation.

The rear universal joint comprises outer and inner members 22 and 23, similar to the parts 21 and 20 and fastened, respectively, to the shaft 7 and to a shell 24. This shell incloses the enlargement 25, on the forward end of the engine-shaft, which is usually provided for the purpose of engagement with a hand-crank for starting the engine, and the shell and the enlargement are fastened together by a transverse pin 26.

In order to restrict longitudinal movement of the power-shaft 7, and to avoid objectionable looseness and rattling in this member while at the same time permitting the necessary relative movements of the parts to accommodate them to various changes in position incidental to the operation of the machinery, a cushion is interposed between the members of each universal joint, this cushion being made of yielding material, for which purpose felt is well adapted. The felt is sufficiently firm to maintain a constant slight pressure against the ends of the power-shafts, and thus prevent it from rattling longitudinally, while at the same time it will yield to absorb any slight longitudinal movement which may occur in the engine-shaft when the engine is running, or to accommodate itself to any relative angular movement of the parts due to springing of the vehicle-frame.

In addition to performing the function just described, the cushions 27, being made of absorbent material, may be saturated with lubricating oil, which they will supply gradually to the bearing-surfaces of the universal joints.

To prevent the admission of dirt or moisture to the forward universal joint, which is located in an exposed position on the vehicle, I employ a washer 28 of felt or other yielding material, which is seated in a recess formed by a flange 29 which projects loosely around the joint-member 27, and the felt washer abuts against the forward edge of this joint-member, as shown in Fig. 3, thus not only excluding grit and moisture from the joint, but also serving to retain lubricant therein.

To assist the application of the apparatus to a vehicle, and the proper alinement of the several shafts, I employ a device in the form of a gage-member 30, which projects rigidly, and preferably integrally, from the rear end of the base 9, and of which the lower portion is perforated for the passage of the shaft 7, this perforated portion being sufficiently large to afford clearance around the shaft, as shown in Fig. 3. This gage is so located that when the power-shaft 7 is exactly parallel with the armature-shaft of the dynamo, it will be exactly concentric with the perforation in the gage. Consequently, if the base 9 has been mounted and adjusted to hold the armature-shaft of the dynamo parallel with the side frame-members 13, an adjustment which may be easily made by bending the cross-bar 12 more or less if necessary, it will be known, if the gage 30 is in proper concentric relation to the power-shaft, that everything is lined up correctly, the power-shaft and the counter-shaft being axially in alinement with the engine-shaft, so as to minimize the wear and loss of power in the connections between the shafts.

In order that the apparatus may be readily adapted and fitted to motor-vehicles of various designs, one of the universal joints is fitted to the power-shaft in such a way that its position may be readily changed, and the length of the shaft adjusted according to the circumstances. For this purpose the coupling-member 21 is fastened to the power-shaft by a key 31, which engages a key-way 32 in the shaft. The shaft is made originally of the greatest length which may be necessary, and the key-way is elongated, as shown in Fig. 3. Accordingly, in fitting the apparatus to the vehicle, the shaft may be cut to the required length, and the joint-member keyed to it wherever this may be necessary. For additional security a pin is preferably passed through the joint-member and the shaft, as shown in Fig. 3.

In some cases it may be necessary to employ the usual hand-crank in starting the engine, when the dynamo is used only as an electric generator, or in the case of failure of some part of the apparatus when it is designed for use also as a starting-motor. Accordingly, the forward end of the counter-shaft 19 is provided with a notched shell 33, of the usual form, to receive the crank, the shaft being also bored to receive a dowel or extension from the crank. The parts just described are normally inclosed by a cover 34, which is removably held in place by a spring-catch 35.

To provide for such adjustment of the sprocket-chain 6 as may be necessary, the dynamo is connected movably with the base 9. For this purpose a cradle 36 is employed, this cradle being pivoted, at one side, on a rod 37 fixed in lugs on the base, while the cradle is supported, at the other side, by a screw 38 threaded in the base and adjustable therein. The cradle is held down against the screw 38 by an eye-bolt 39, pivoted to the cradle and having a nut 40 engaging the bottom of the base. The screw 38 and the eye-bolt provide for vertical adjustment of the cradle by pivotal movement about the rod 37, and also provide means by which the cradle is firmly fixed in adjusted position.

The cradle is shaped to conform to the substantially cylindrical form of the frame or casing of the dynamo, and the dynamo is fixed in the cradle by means of a metal strap 44, which is divided in the middle and connected by a bolt 45, by which it may be subjected to tension so as to clamp the generator firmly against the cradle and prevent rotation of the generator.

While the vertical adjustment of the cradle provides for movement of the dynamo and the armature-shaft to vary the distance from the countershaft 19, and consequently adjust the tension of the chains 6, it is desirable to provide means for sustaining the armature-shaft against the pull of the chain, when the apparatus is in operation, more directly and rigidly than can be done through the cradle. Accordingly, the dynamo is provided at its forward end with an arm 41 integral with the dynamo-casing, and this arm has, at its lower end, an inclined or eccentric surface 42, which rests against a shoulder 43 on the base 9. The arm and the shoulder lie so nearly in the plane of the sprocket-chain that they constitute rigid abutments through which the pull of the chain is sustained without strain on the cradle or on other parts of the mechanism. When the cradle is vertically adjusted to take up slack in the chain the abutments may also be adjusted, owing to the fact that the dynamo is rotatably mounted on the cradle. For this purpose it is necessary only to loosen the bolt 45, whereupon the dynamo may be turned, thus causing the arm 41, in consequence of its eccentric bearing-surface, to properly engage the shoulder 43 whatever the vertical position of the generator.

The location of the gearing which connects the armature-shaft with the power-shaft, at the outer end of the armature-shaft, that is, at the end more remote from the engine-shaft, while not the most direct and obvious arrangement, is one which has substantial practical advantages, for not only does it bring the gearing in a position in which it is readily accessible for the purpose of lubrication and adjustment, but it also provides for the use of a power-shaft of maximum length, and this, in turn, minimizes the effect, on the universal joints, of any slight inaccuracy in alinement of the countershaft and the engine-shaft due to carelessness in adjusting the apparatus, or to the shocks to which it is subjected when in use. The arrangement provides, further, for a position of the dynamo as close as possible to the front of the vehicle, thus contributing to the neat and compact appearance in the apparatus.

My invention is not limited to the embodiment thereof hereinbefore described and illustrated in the accompanying drawings, but it may be embodied in various other forms within the nature of the invention as it is defined in the following claims.

I claim:—

1. In a motor vehicle, the combination, with an engine-shaft accessible at the end of the vehicle, of a dynamo-electric machine; a base, supporting the dynamo with its armature-shaft in substantially horizontal fore-and-aft position, and provided, below the dynamo, with bearings for a counter-shaft; a countershaft journaled in said bearings; gearing connecting the countershaft with the forward end of the armature-shaft; means for supporting the base upon the vehicle-frame, at the end thereof, with the countershaft approximately in line with the engine-shaft; and a power-shaft extending from the countershaft to the engine-shaft and connected by universal joints with said shafts.

2. In a motor-vehicle, the combination, with an engine-shaft accessible at the end of the vehicle, a transverse frame-member adjacent said shaft, and side frame-members projecting at said end of the vehicle, of a dynamo-electric machine; a base supporting said machine and fixed, at one end, to said transverse frame-member; a cross-bar supporting the opposite end of the base and mounted, at its ends, on said projecting side frame-members, the dynamo-electric machine being mounted with its armature-shaft substantially parallel with the axis of the engine-shaft; gearing connected with, and located near, the end of the armature-shaft remote from the engine-shaft; and a power-shaft connecting said gearing with the engine-shaft and lying substantially in line therewith and below said base.

3. In a motor-vehicle, the combination, with an engine-shaft accessible at the end of the vehicle, of a dynamo-electric machine; means for supporting said machine upon the exterior of the vehicle, with its armature-shaft substantially parallel with the axis of said engine-shaft; gearing connected with, and located near, the end of the armature-shaft remote from the engine-shaft; a power-shaft extending rearwardly from the gearing to the engine-shaft; universal joints connecting the ends of the power-shaft, respectively, with the gearing and the engine-shaft; and a gage-member connected with the dynamo-electric machine and having a part loosely encircling, but not normally engaging, the power-shaft at a point remote from the end connected with the gearing, said gage-member being of such length that its encircling part is concentric with the power-shaft when the latter is in a position parallel with the armature-shaft.

4. In a motor-vehicle, the combination, with an engine-shaft accessible at the end of the vehicle, of a dynamo-electric machine; means for supporting said machine upon the exterior of the vehicle, with its armature-shaft substantially parallel with the axis of said engine-shaft; gearing connected with, and located near, the end of the armature-shaft remote from the engine-shaft; a power-shaft extending rearwardly from the gearing to the engine-shaft; universal joints connecting the ends of the power-shaft, respectively, with the gearing and the engine-shaft, said universal joints each comprising two interengaging members formed to prevent relative rotation but to permit free relative longitudinal movement; and a cushion of yielding material located between the members of each joint to limit longitudinal movement of the power-shaft.

5. Electric apparatus, for a motor-vehicle, having, in combination, a rigid base; a countershaft journaled thereon and carrying a sprocket-wheel; a dynamo-electric machine; a sprocket-wheel on the armature-shaft of said machine; a chain connecting the sprocket-wheels; a cradle pivoted to the base on an axis parallel with the axes of the countershaft and the armature-shaft and formed to receive and support the dynamo-electric machine, said machine being rotatable, in said cradle, substantially about its armature-axis; means connecting the cradle with the base and normally preventing pivotal movement of the cradle, but adjustable to swing the cradle in a direction to vary the distance between the armature-shaft and the countershaft; means normally preventing rotation of the dynamo-electric machine in the cradle; and an abutment, on said machine, having a surface eccentric to the armature-axis and adapted to engage a surface of the base, said abutment being located approximately in the plane of the sprocket-chain so as to sustain the pull thereof and being adjustable, by rotation of the dynamo-electric machine in the cradle, to maintain it in operative position in the various adjusted positions of the cradle.

6. In a motor-vehicle, the combination, with an engine-shaft accessible at the end of a vehicle, of a dynamo-electric machine; a base, supporting the dynamo with its armature-shaft in substantially horizontal fore-and-aft position, and provided, below the dynamo, with bearings for a countershaft; a countershaft journaled in said bearings and parallel with the armature-shaft; sprocket-chain gearing connecting said shafts; adjustable connections between the dynamo and the base to permit the dynamo to be moved toward or from the countershaft to adjust the chain; means for supporting the base on the frame of the vehicle with the countershaft substantially alined with the engine-shaft; a power-shaft connecting the engine-shaft with the countershaft; and a removable cover fixed to the base and inclosing the dynamo and the chain-gearing.

In testimony whereof, I affix my signature in presence of two witnesses.

EDWARD A. HALBLEIB.

Witnesses:
 FARNUM F. DORSEY,
 D. GURNEE.